United States Patent
Kubo (10) Patent No.: US 7,740,466 B2
(45) Date of Patent: Jun. 22, 2010

(54) MOLDING DEVICE FOR MOLDING A WEATHER STRIP

(75) Inventor: Yoshihisa Kubo, Aichi-ken (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 230 days.

(21) Appl. No.: 11/819,312

(22) Filed: Jun. 26, 2007

(65) Prior Publication Data
US 2008/0001324 A1    Jan. 3, 2008

(30) Foreign Application Priority Data

Jun. 29, 2006 (JP) ............... P-2006-179323
Jun. 29, 2006 (JP) ............... P-2006-180075

(51) Int. Cl.
*B29C 45/14* (2006.01)

(52) U.S. Cl. .............. 425/123; 425/117; 425/259; 264/259; 264/261

(58) Field of Classification Search ............ 264/177.1, 264/259.261; 425/516, 113, 177.1, DIG. 55, 425/123, 577, 556, 438, 117, 259; 249/11, 249/134, 114.1, 115

See application file for complete search history.

(56) References Cited

U.S. PATENT DOCUMENTS

| 5,250,241 | A | 10/1993 | Iwasa et al. |
| 5,374,386 | A | 12/1994 | Nagata |
| 5,972,268 | A | 10/1999 | Nakajima et al. |

FOREIGN PATENT DOCUMENTS

| JP | 4-9645 | 2/1992 |
| JP | 7-49203 | 5/1995 |

*Primary Examiner*—Khanh Nguyen
*Assistant Examiner*—Saeed M Huda
(74) *Attorney, Agent, or Firm*—McGinn IP Law Group, PLLC

(57) ABSTRACT

A molding device is provided with a holding portion for clamping the end of an extruded portion, and a cavity for forming a molded portion. The holding portion has holding cores to come in contact with the end of the extruded portion, and at least a part of the holding cores is formed by a material with a low thermal conductivity. Thus, the molding method of a weather strip includes, clamping the end of the extruded portion by the holding portions, then, ejecting or injecting a rubber material for molding the molded portion in the cavity, and then, molding the rubber by vulcanization.

7 Claims, 10 Drawing Sheets

PRIOR ART

FIG. 16

PRIOR ART

FIG. 17

PRIOR ART

FIG. 18

PRIOR ART

FIG. 19

PRIOR ART

FIG. 20

PRIOR ART

MOLDING DEVICE FOR MOLDING A WEATHER STRIP

BACKGROUND OF THE INVENTION

1. Field of the Invention

The present invention relates to a molding method of a weather strip in which a molded portion is molded at an end of an extruded portion of the weather strip, and the extruded portion is formed by extrusion, and a mold for molding the molded portion.

2. Related Art

A seal between a door of an automobile and a peripheral part of a body opening is accomplished by a door weather strip attached to an outer part of a door frame provided at an outer peripheral portion of the door, and/or an opening weather strip attached at a flange of the peripheral part of the body opening. Incidentally, a seal between a door glass and the door is accomplished by a glass run attached to a channel at an inner part of the door frame.

Figure 15:
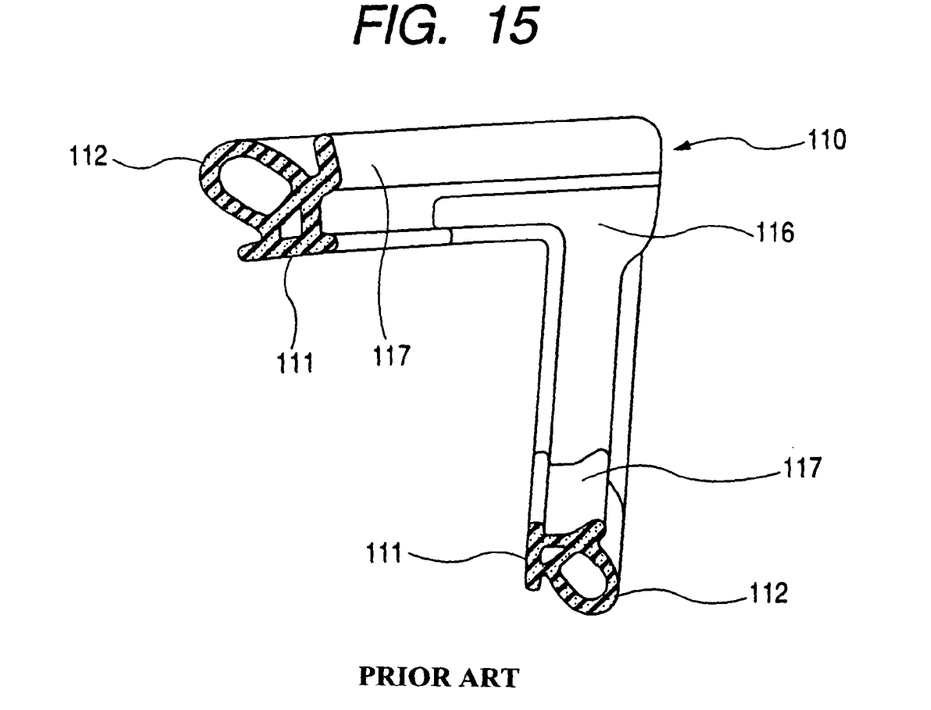
FIG. 15 is a perspective view of the door weather strip manufactured by a conventional method.

As shown in FIG. 15, a door weather strip 110 is formed along a door frame (not shown), and includes extruded portions 117, linearly formed by extrusion, which are portions to be attached to an upper portion, front and rear side portions, and a lower portion of the door frame, and a molded portion 116 molded by molding which is a portion to be attached along the corner portions of the door frame.

The extruded portions 117 include an attachment base 111 (hereinafter referred to the base) to be attached to the door frame, and a hollow seal portion 112 integrally formed from the base 111, and to come in contact with the peripheral part of the body opening for sealing.

The shapes of the cross sections of the end faces of the molded portion 116 are formed in the same manner as the shapes of the cross sections of the extruded portions 117 to which the end faces are respectively connected.

Figure 16:
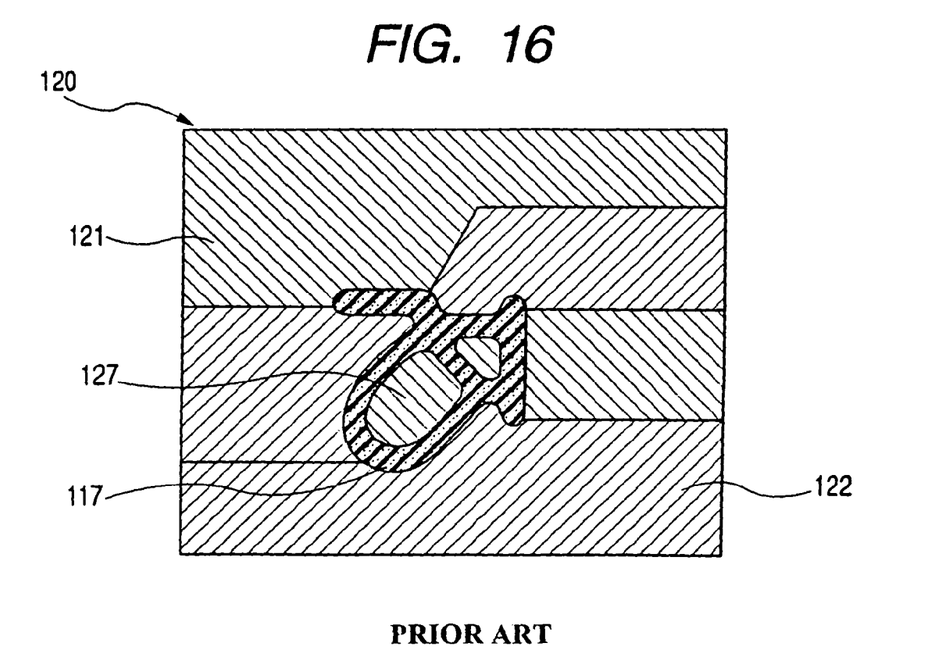
FIG. 16 is a cross sectional view in a direction at right angles to the longitudinal direction of the corner portion of the door weather strip, of the molding device for molding another door weather strip in the related art.
Figure 17:
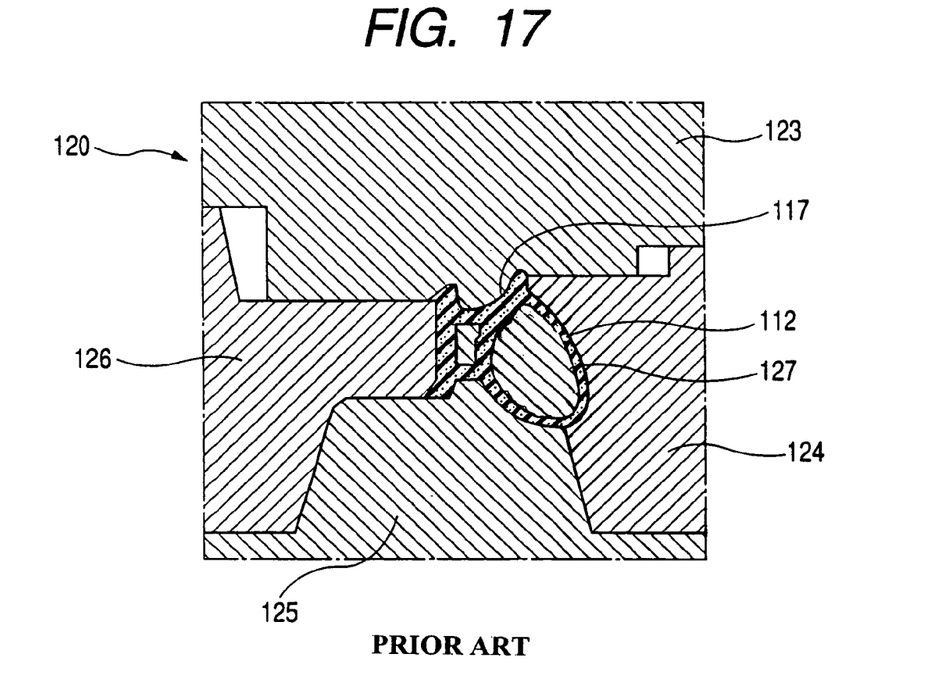
FIG. 17 is a cross sectional view in a direction at right angles to the longitudinal direction of the corner portion of the door weather strip, of a molding device for molding a still other door weather strip in the related art.
Figure 18:
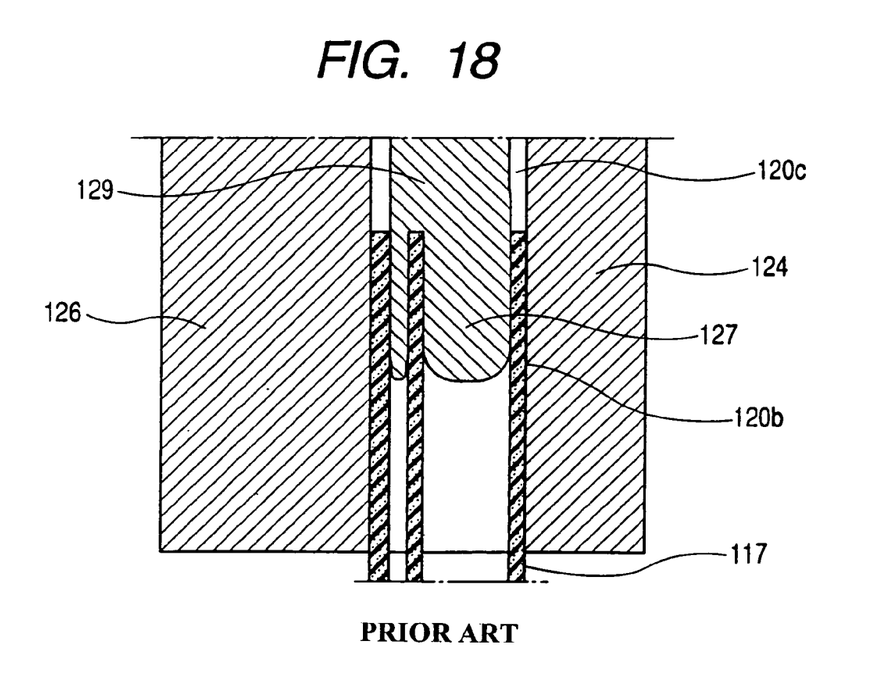
FIG. 18 is a cross sectional view in a direction in parallel with the longitudinal direction of the corner portion of the door weather strip, of the molding device for molding the another door weather strip in the related art.

Molding of the molded portion 116 is carried out by injecting a molding material into a cavity 120c formed between an upper mold 121 and a lower mold 122 of a molding device 120 as shown in FIGS. 16 to 18. When the molded portion 116 is molded, the extruded portions 117 and the molded portion 116 are integrally adhered by vulcanization and deposited simultaneously with the molding. For this reason, the ends of the extruded portions 117 are clamped by a holding portion 120b of the molding device (e.g., see, JP-B2-4-9645 and JP-B2-7-49203). At this step, the extruded portions 117 are required to be strongly clamped so as to be prevented from coming out of the molding device 120 by the pressure of the molding material injected into the cavity 120c.

Clamping of the ends of the extruded portions 117 is accomplished by pressing outer surfaces of ends of the extruded portions 117 by an inner core 129 formed integrally with an insertion core portion 127 of the molding device 120, a first holding core 123, a second holding core 124, a third holding core 125, and a fourth holding core 126 as shown in FIGS. 16 to 19. FIG. 17 shows a cross section in a direction at right angles to the longitudinal direction of the extruded portion 117 at the rear side portion in the molding device 120.

FIG. 18 shows a cross section along the longitudinal direction of the extrusion portion 117 in the holding portion 120b of the molding device 120. The extruded portion 117 is clamped by the holding portion 120b of the molding device 120. Thus, into the cavity 120c, the molding material for the molded portion 116 is injected. In the inside of the hollow seal portion 112 of the extruded portion 117, the insertion core portion 127 is inserted, and it supports the extruded portion 117 from inside when the end thereof is pressed.

Figure 19:
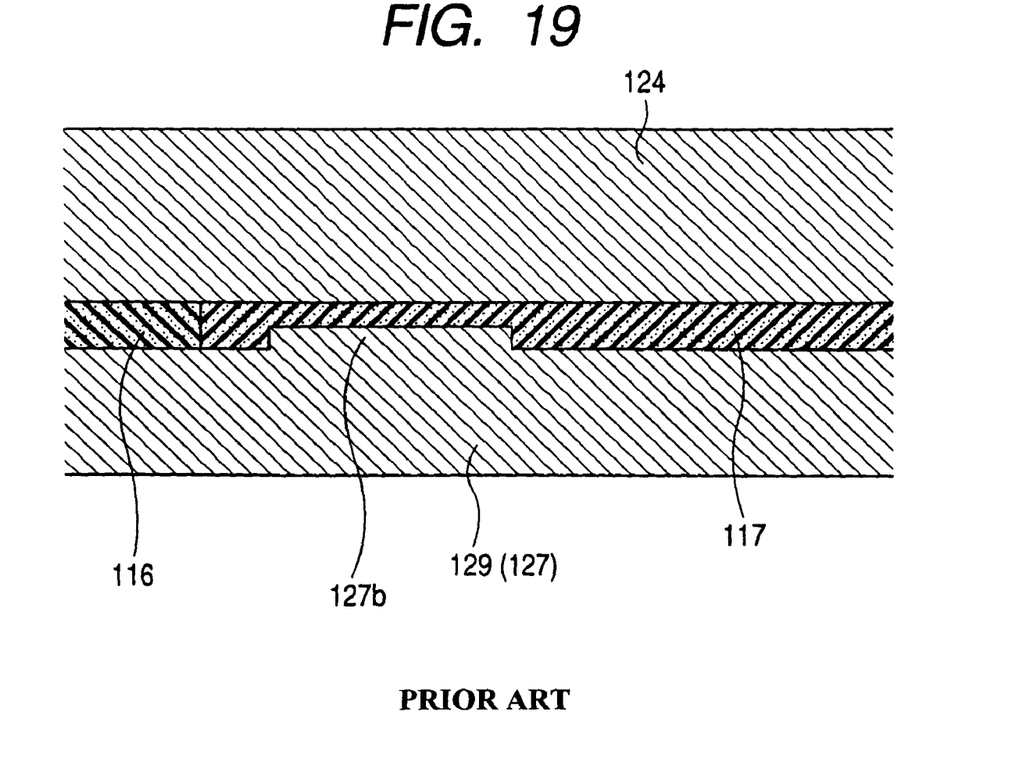
FIG. 19 is an enlarged cross sectional view of the portion for clamping the ends of the door weather strip of FIG. 18.

An enlarged cross section of the pressed portion is shown in FIG. 19. In the cavity 120c, an unvulcanized rubber material which is a molding material is injected. At this step, in order to prevent the end of the extruded portion 117 made of sponge rubber from coming out of the holding portion 120b, a convex portion 127b is formed at the outer periphery of the insertion core portion 127. With this configuration, the end of the extruded portion 117 is compressed.

Figure 20:
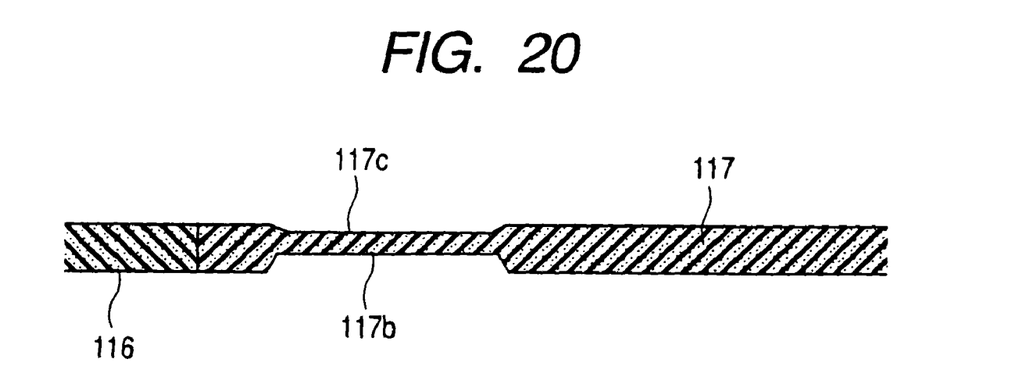

When the molded portion 116 is molded, the molding device 120 has been heated for vulcanization because the molding material is rubber. The extruded portion 117 has been already vulcanized, and hence it will not be molten by the heat of the molding device 120. However, the clamped end of the extruded portion 117 is fixed in shape by heat while being compressed as shown in FIG. 20, so that a concave portion 117b is formed. In this case, not only the inner side of the extruded portion 117, but also the outer side is drawn to the inner side, so that a concave portion 117c is formed. This unfavorably causes a problem of degradation of appearance of the end of the extruded portion 117 of the door weather strip 110.

When the amount of the end of the extruded portion 117 to be compressed is reduced, the depths of the concave portions 117b and 117c are reduced. However, the clamping force on the end is reduced, so that the end becomes more likely to come out of the molding device 120 by the pressure of the molding material for the molded portion 116.

SUMMARY OF THE INVENTION

Under such circumstances, it is an object of the present invention to provide a molding method of a weather strip, in which in molding a molded portion by molding at an end of the extruded portion formed by extrusion of the weather strip, molding is carried out while keeping a good appearance of the end of the extruded portion, and a molding device for use in the molding method.

In order to overcome the problem, in accordance with a first aspect of the present invention, there is provided a molding method of forming a weather strip including an extruded portion and a molded portion connected with an end of the extruded portion with a molding device which is provided with a holding portion for clamping the end of the extruded portion and a cavity for forming the molded portion, wherein the holding portion has a holding core to come in contact with the end of the extruded portion, and the holding core is provided with a thermal conduction diminising portion, the molding method comprising the steps of:

providing an extruded portion formed by extrusion;

clamping the end of the extruded portion by the holding portion;

injecting an unvulcanized rubber material in the cavity; and molding the molded portion integraged to the end of the extruded portion by vulcanizing the rubber material to form a rubber.

Preferably, at least a part of the thermal conduction diminising portion is formed by a material with a low thermal conductivity.

In the invention, a molding device is provided with a holding portion for clamping the end of the extruded portion, and the cavity for forming the molded portion, the holding portion has a holding core to come in contact with the end of the extruded portion, and a thermal conduction diminishing portion to diminish thermal conduction within the molding device. More specifically, a part of the thermal conduction diminishing portion is formed by a material with a low thermal conductivity. This can reduce the transfer of heat of the molding device to the end of the extruded portion, which can reduce the indent depth left in the surface due to heat reforming of the end. Therefore, it is possible to make favorable the appearance of the end of the extruded portion.

The end of the extruded portion is clamped by the holding portion, and then, an unvulcanized rubber material for molding the molded portion is injected into the cavity, and molded (vulcanized). Therefore, the extruded portion will not shift from or come out of the molding device. It is possible to connect the extruded portion and the molded portion with reliability.

In the invention, there is provided a molding method of a weather strip, wherein the extruded portion has a hollow seal portion, the holding portion of the molding device is provided with an insertion core formed by a material with a low thermal conductivity, and to be inserted into the hollow seal portion, and a holding core for clamping the outer side of the hollow seal portion, and for molding the hollow seal portion of the molded portion continuous to the hollow seal portion of the extruded portion, the outer side of the hollow seal portion of the extruded portion is pressed and clamped by the insertion core and the holding core, then, in the cavity of the molding device in which an inner core integrally formed with the insertion core is disposed, the unvulcanized rubber material for forming the molded portion is injected, and then the rubber is molded by vulcanization.

With this configuration, the end of the hollow seal portion of the extruded portion can be located continuous to the end of the cavity for forming the hollow seal portion of the molded portion, and it is possible to clamp the hollow seal portion of the extruded portion with reliability.

As for the hollow seal portion of the extruded portion, the outer side of the hollow seal portion is pressed by the insertion core and the holding core, then, in the cavity, an unvulcanized rubber material for molding the molded portion is injected. This prevents the extruded portion from shifting from or coming out of the molding device. Thus, the hollow seal portions of the extruded portion and the molded portion can be aligned with each other, and the extruded portion and the molded portion can be connected to each other with reliability. Further, it is possible to reduce the indent depth left in the surface of the hollow seal portion of the extruded portion.

In the invention, there is provided a molding method of a weather strip, wherein the extruded portion has a seal lip portion, and the molding device has a holding core to come in contact with and clamp the opposite sides of the seal lip portion, and the holding core is formed by a material with a low thermal conductivity.

This can reduce the transfer of heat from the molding device to the surface of the seal lip portion of the end of the extruded portion, which can reduce the indent depth left in the surface of the seal lip portion. Thus, it is possible to make favorable the appearance of the seal lip portion of the extruded portion.

In the invention, the end of the extruded portion may be compressed to a thickness of 0.1 mm to half the thickness, and clamped.

In accordance with the above invention, it is possible to clamp the end with reliability. Thus, even when an unvulcanized rubber material for forming the molded portion is injected into the cavity, the extruded portion will not shift from or come out of the molding device. Further, at the compressed portion of the end of the extruded portion, a part of the holding core including a material with a low thermal conductivity is disposed. Therefore, even when the end is largely compressed, heat is not transferred thereto, so that the compressed portion will not be left in the form of depression.

In the invention, there is provided a molding device for a weather strip for integrally molding a molded portion by molding at the end of an extruded portion of the weather strip formed by extrusion, the molding device has a holding portion for clamping the end of the extruded portion, and a cavity for forming the molded portion, the holding portion has a holding core to come in contact with the end of the extruded portion, and at least a part of the holding core is formed by a material with a low thermal conductivity.

In accordance with the above construction, even when an unvulcanized rubber material for molding the molded portion is injected in the cavity, the extruded portion will not shift from or come out of the molding device. As a result, it is possible to form the molded portion continuously to and integrally with the end of the extruded portion.

Further, the holding portion has a holding core to come in contact with the end of the extruded portion, and at least a part of the holding core is formed by a material with a low thermal conductivity. This can reduce the transfer of heat from the molding device to the end of the extruded portion, which can almost eliminate the indent depth left in the surface of the end. Thus, it is possible to make favorable the appearance of the end of the extruded portion.

In the invention, there is provided a molding device for a weather strip, wherein the extruded portion of the weather strip has a hollow seal portion, the holding portion of the molding device is provided with an insertion core to be inserted into the hollow seal portion, a holding core for pressing and clamping the outer side of the hollow seal portion. The holding portion includes a thermal conduction diminishing porttion to diminish a thermal conduction within the molding device such as an insertion core formed by a material with a low thermal conductivity.

With this configuration, the end of the hollow seal portion of the extruded portion can be located continuous to the end of the cavity for molding the hollow seal portion of the molded portion. It is possible to clamp the inner side and the outer side of the hollow seal portion by the holding core with reliability. Thus, even when a material for molding the molded portion is injected, the extruded portion will not shift from or come out of the molding device. As a result, it is possible to connect the extruded portion and the molded portion with reliability.

The hollow core may be also formed by a material with a low thermal conductivity. This can reduce the transfer of heat of the molding device to the inner side of the hollow seal portion of the extruded portion, which can reduce the indent depth left in the surface of the end. Thus, it is possible to make favorable the appearance of the end of the extruded portion.

In the invention, there is provided a molding device for a weather strip, wherein the extruded portion of the weather strip has a seal lip portion, the holding portion of the molding device is provided with a holding core for pressing and clamping the outer side and the inner side of the seal lip portion, and at least the pressing side of the holding core is formed by a material with a low thermal conductivity.

This can reduce the indent depth in the surface of the seal lip portion of the end of the weather strip. Thus, it is possible to make favorable the appearance of the seal lip portion of the end of the extruded portion.

In the invention, there is provided a molding device for a weather strip wherein for the holding core for clamping the seal lip portion, the inner core is formed by a material with a low thermal conductivity.

This can reduce the indent depth of the front surface and the back surface of the seal lip portion. Thus, it is possible to make favorable the appearance of the seal lip portion of the end of the extruded portion.

In the invention, there is provided a molding device for a weather strip, wherein a heat insulation space or a heat insulating material is provided between the holding core and the mold body.

With this configuration, the transfer of heat of the mold body to the holding core is reduced, which reduces the transfer of heat to the end of the extruded portion. This can reduce the indent depth in the surface of the end. Thus, it is possible to make favorable the appearance of the seal lip portion of the end of the extruded portion.

In the invention, the material with a low thermal conductivity may be a heat resistant synthetic resin or a heat resistant rubber.

With this configuration, the thermal conductivity is lower as compared with that of a metal. Thus, the amount of heat to be transferred from the molding device to the surface of the end of the extruded portion can be reduced. In addition, the molding device can be reduced in weight. As a result, handling thereof becomes easy, which can raise the efficiency of the molding operation.

In accordance with the present invention, the holding portion of the molding device has a holding core to come in contact with the end of the extruded portion and a thermal conduction diminishing portion to diminish the thermal conduction within the molding device. With this configuration, heat is less transferred from the molding device to the end of the extruded portion. This can almost eliminate the depression in the surface of the end of the extruded portion. Thus, it is possible to make favorable the appearance of the end of the extruded portion.

Further, in accordance with another aspect of the invention, the thermal conduction diminishing portion may be provided with a cooling hole for cooling the holding core formed in the inside thereof, such that a refrigerant is circulated through the cooling hole. This can cool the heat transferred to the holding core from the body of the molding device, and thus can prevent the heat from being transferred to the end of the extruded portion. As a result, it is possible to reduce the indent depth left in the surface due to heat reforming of the end. Therefore, it is possible to make favorable the appearance of the end of the extruded portion.

After clamping the end of the extruded portion by the holding portion, a rubber material for forming the molded portion is injected into the cavity, and molded. Therefore, the extruded portion will not shift from or come out of the molding device. It is possible to connect the extruded portion and the molded portion with reliability.

In the invention, the extruded portion of the weather strip has a seal lip portion, and the molding device has a holding core to come in contact with and clamp the surface of the seal lip portion, and the holding core includes the cooling hole for cooling the holding core formed therein, such that a refrigerant is circulated through the cooling hole. This can reduce the surface temperature of the holding core, which can reduce the indent depth left in the surface of the seal lip portion. Thus, it is possible to make favorable the appearance of the seal lip portion of the extruded portion.

In the invention, the end of the extruded portion is compressed to a thickness of 0.1 mm to half the thickness, and clamped. Therefore, it is possible to clamp the end with reliability. Thus, even when an unvulcanized rubber material for molding the molded portion is injected in the cavity, the extruded portion will not shift from or come out of the molding device. Besides, it is possible to reduce the indent depth left in the surface of the compressed portion of the end by cooling the holding core to reduce the surface temperature of the holding core during the formation.

In the invention, the molding device has a holding portion for clamping the end of the extruded portion, and a cavity for forming the molded portion. Therefore, even when an unvulcanized rubber material for molding the molded portion is injected into the cavity, the extruded portion will not shift from or come out of the molding device. As a result, it is possible to form the molded portion continuously to and integrally with the end of the extruded portion.

The holding portion has the holding core to come in contact with the end of the extruded portion, and at least a part of the holding core includes a cooling hole, through which a refrigerant for cooling the holding core is circulated, formed therein. This can reduce the temperature of the surface of the holding core, which can reduce the indent depth left in the surface of the end of the extruded portion. Thus, it is possible to make favorable the appearance of the end of the extruded portion.

The holding core includes a cooling hole, through which a refrigerant for cooling the holding core is circulated, formed in the inside thereof. This can reduce the temperature of the surface of the hollow core. This can reduce the transfer of heat of the molding device to the inner side of the hollow seal portion of the extruded portion, which can reduce the indent depth left in the surface of the end. Thus, it is possible to make favorable the appearance of the end of the extruded portion.

The molding device for forming a weather strip is configured such that the extruded portion of the weather strip has a seal lip portion, the holding portion of the molding device is provided with the holding core for pressing and clamping the outer side and the rear side of the seal lip portion, and at least a part of the holding core includes a cooling hole, through which a refrigerant for cooling the holding core is circulated, formed in the inside thereof. This can reduce the temperature of the surface of the holding core. This can reduce the indent depth left in the surface of the seal lip portion of the end of the weather strip. Thus, it is possible to make favorable the appearance of the seal lip portion of the end of the extruded portion.

A heat insulation space or a heat insulating material may be provided between the holding core and the mold body. With this configuration, the transfer of heat of the mold body to the holding core is reduced, which reduces the transfer of heat to the end of the extruded portion. This can reduce the indent depth left in the surface of the end. Thus, it is possible to make favorable the appearance of the end of the extruded portion.

The refrigerant may be water, and hence it can cool the holding core and the hollow core safely and effectively.

In accordance with the present invention, the holding portion of the molding device has the holding core to come in contact with the end of the extruded portion, and at least a part of the holding core includes a cooling hole for cooling the holding core formed in the inside thereof, such that a refrigerant is circulated through the cooling hole. With this configuration, it is possible to reduce the temperature of the surface of the holding core to come in contact with the end of the extruded portion. This can almost eliminate the depression left in the surface of the end. Thus, it is possible to make favorable the appearance of the end of the extruded portion.

BRIEF DESCRIPTION OF THE DRAWINGS

FIG. 120 is an enlarged cross sectional view of the portion for clamping the ends of the door weather strip in the related art.

DETAILED DESCRIPTION OF THE PREFERRED EMBODIMENTS

Embodiments of the present invention will be described by reference to FIGS. 1 to 14. Like numerals depicts like members or components to avoid duplication of explanation over the embodiments.

Figure 1:
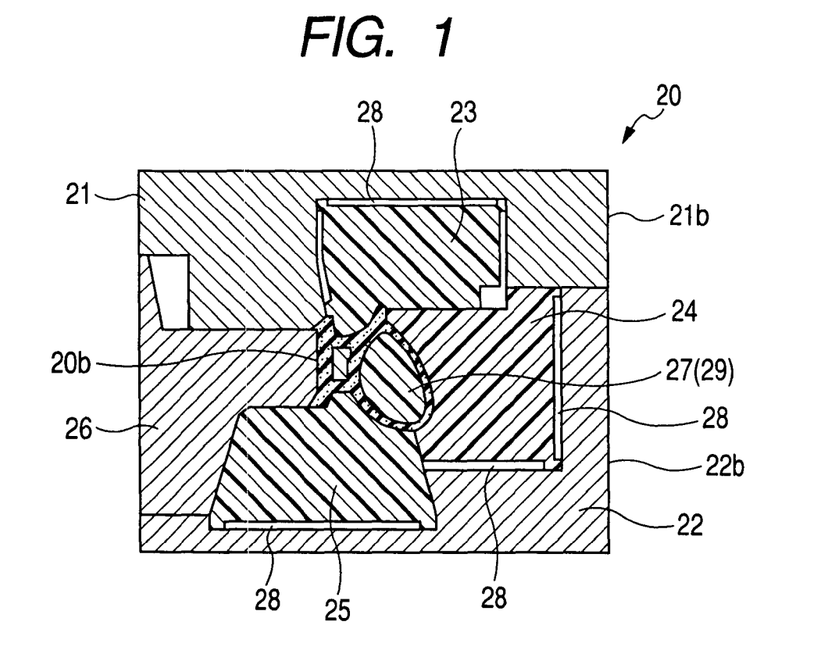
FIG. 1 is a cross sectional view in a direction at right angles to the longitudinal direction of the corner portion to come in contact with the longitudinal side of a door weather strip, in a molding device for molding the corner portion of the door weather strip which is a first embodiment of the present invention.
Figure 2:
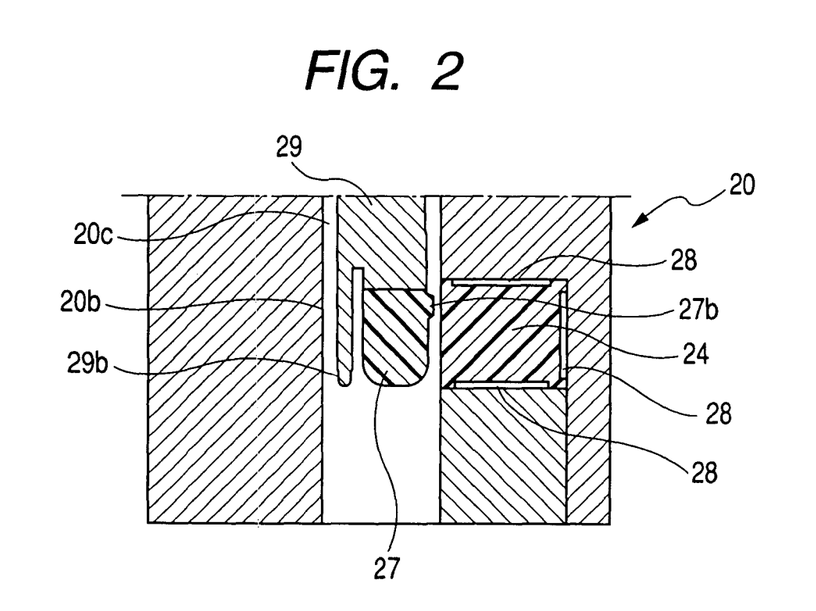
FIG. 2 is a cross sectional view in a direction in parallel with the longitudinal direction of the corner portion to come in contact with the upper side of a door weather strip, in a molding device for molding the corner portion of the door weather strip which is the first embodiment of the present invention.

FIG. 1 is a cross sectional view in a direction at right angles to the longitudinal direction of the end of the corner portion to be in contact with the longitudinal side of a door weather strip 10, in a molding device 20 for molding the corner portion of the door weather strip 10 of a first embodiment of the invention. FIG. 2 is similarly a cross sectional view in a direction in parallel to the longitudinal direction of the end of the door weather strip 10.

Figure 3:
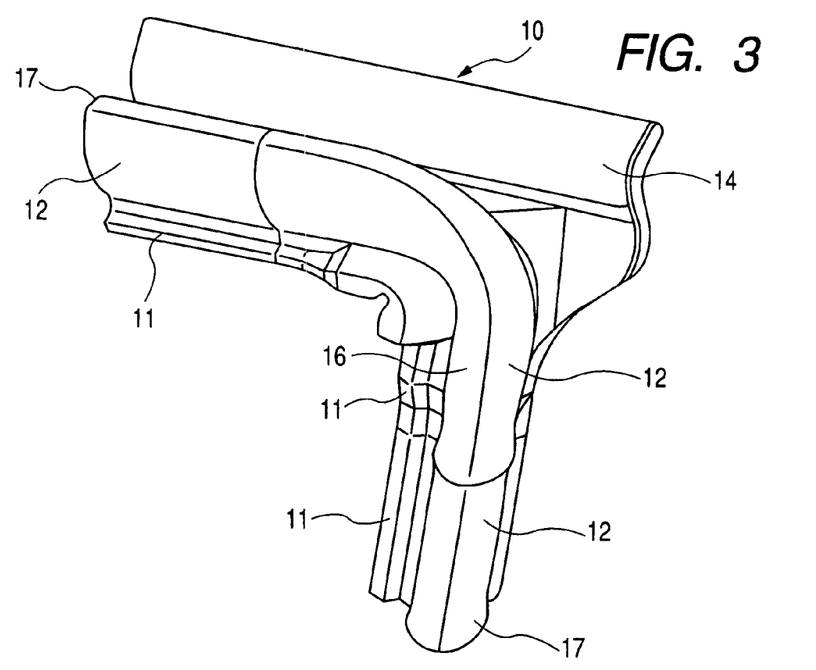
FIG. 3 is a perspective view of the corner portion of the door weather strip manufactured in the first embodiment of the invention as seen from the direction of the vehicle interior.
Figure 4:
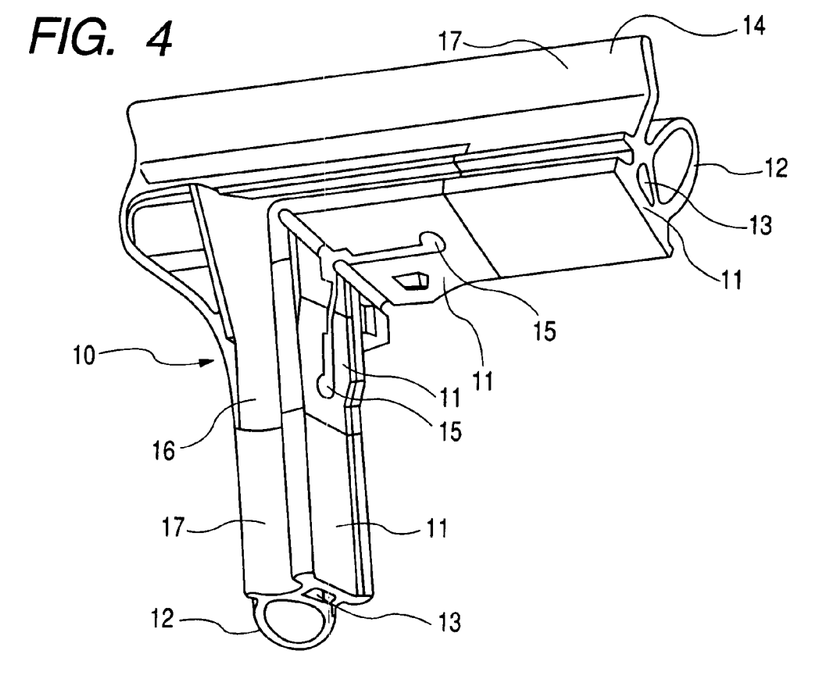
FIG. 4 is a perspective view of the corner portion of the door weather strip manufactured in the first embodiment of the invention as seen from the direction of the vehicle exterior.

FIG. 3 is a perspective view of the corner portion of the door weather strip 10 as seen from the direction of the vehicle interior. FIG. 4 is similarly a perspective view of the corner portion as seen from the direction of the vehicle exterior.

Figure 5:
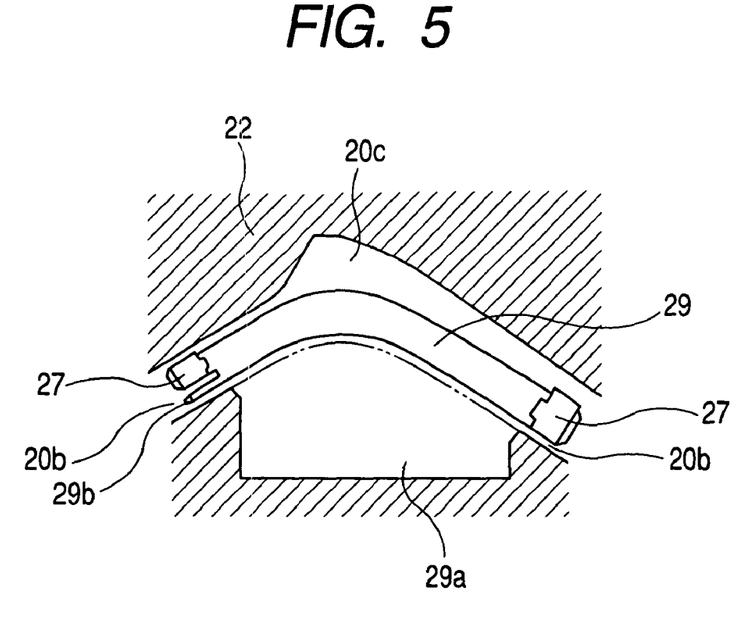
FIG. 5 is a fragmentary plan view showing the arrangement of the molding device for molding the corner portion of the door weather strip which is the first embodiment of the invention.
Figure 6:
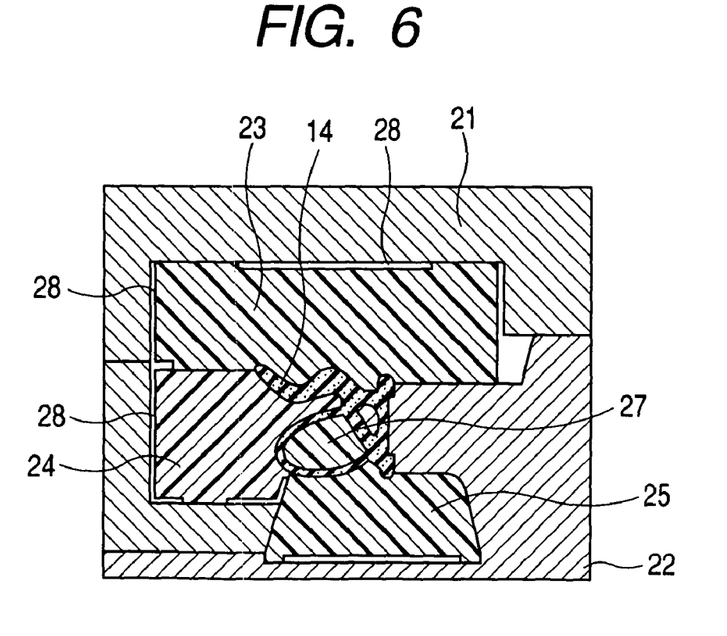
FIG. 6 is a cross sectional view in a direction at right angles to the longitudinal direction of the corner portion to come in contact with the upper side of the door weather strip, of the molding device for forming the corner portion of the door weather strip which is the first embodiment of the invention.

FIG. 5 is a fragmentary plan view showing the arrangement of the inner core 29 disposed in a cavity 20c of the molding device 20. FIG. 6 is a cross sectional view in a direction at right angles to the longitudinal direction of the corner portion to be in contact with the upper side of the end of the door weather strip 10, of the molding device 20 for forming the door weather strip 10.

Figure 7:
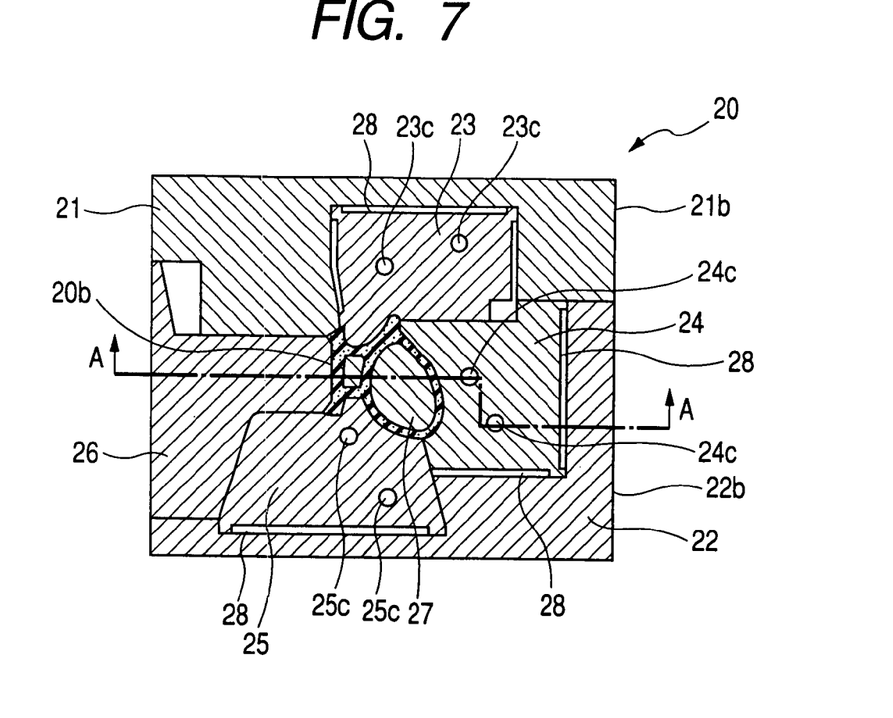
FIG. 7 is a cross sectional view in a direction at right angles to the longitudinal direction of the corner portion to come in contact with the longitudinal side of the door weather strip, in a molding device for molding the corner portion of the door weather strip which is a second embodiment of the present invention.
Figure 8:
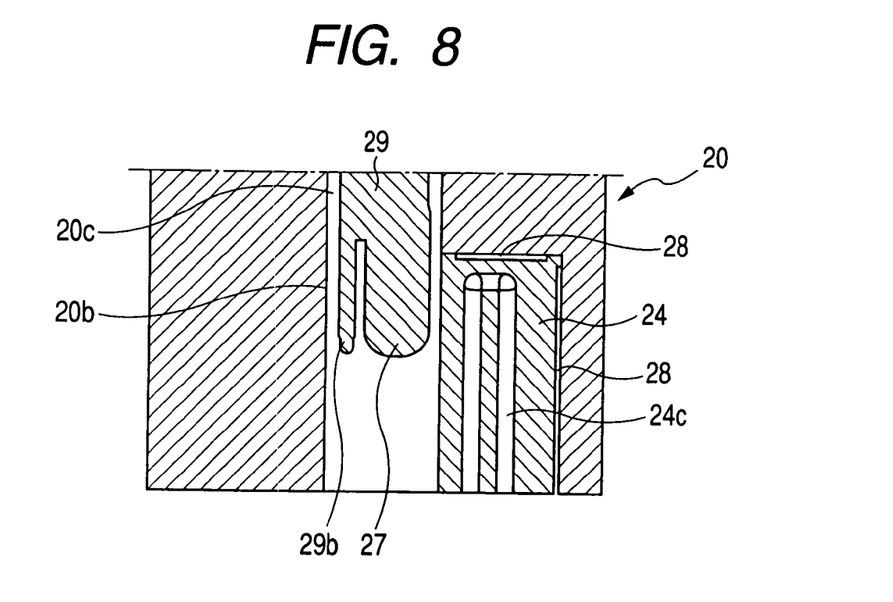
FIG. 8 is a cross sectional view in a direction in parallel with the longitudinal direction of the corner portion to come in contact with the upper side of a door weather strip, in the molding device for molding the corner portion of the door weather strip which is the second embodiment of the invention.

FIG. 7 is a cross sectional view in a direction at right angles to the longitudinal direction of the end of the corner portion to be in contact with the longitudinal side of a door weather strip 10, in a molding device 20 for molding the corner portion of the door weather strip 10 of a second embodiment of the invention. FIG. 8 is similarly a cross sectional view in a direction in parallel to the longitudinal direction of the end of the door weather strip 10.

Figure 9:
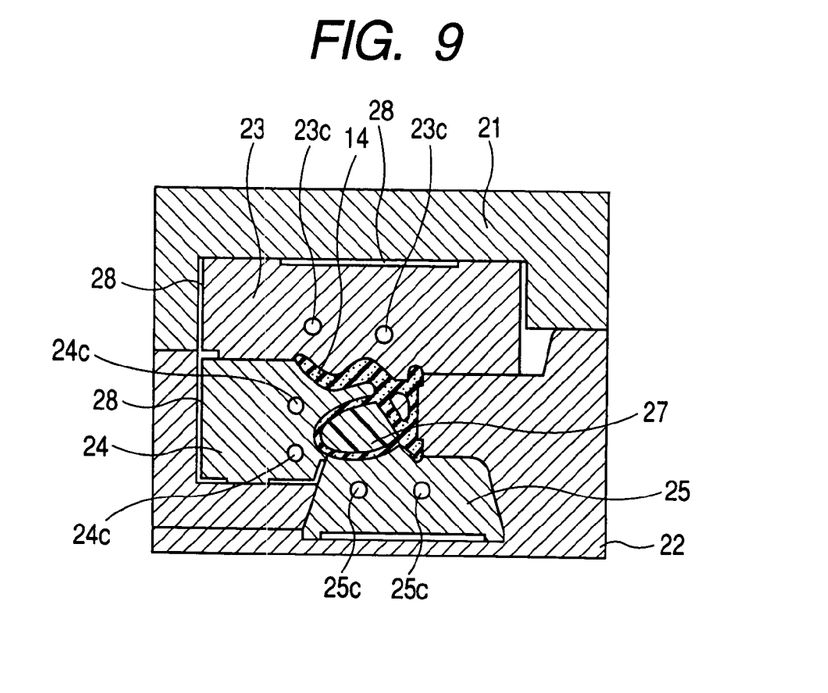
FIG. 9 is a cross sectional view in a direction at right angles to the longitudinal direction of the corner portion to come in contact with the upper side of the door weather strip, of the molding device for forming the corner portion of the door weather strip which is the second embodiment of the invention.

FIG. 9 is a cross sectional view in a direction at right angles to the longitudinal direction of the corner portion to be in contact with the end of the upper side of the door weather strip 10, of the molding device 20 for forming the door weather strip 10.

Figure 10:
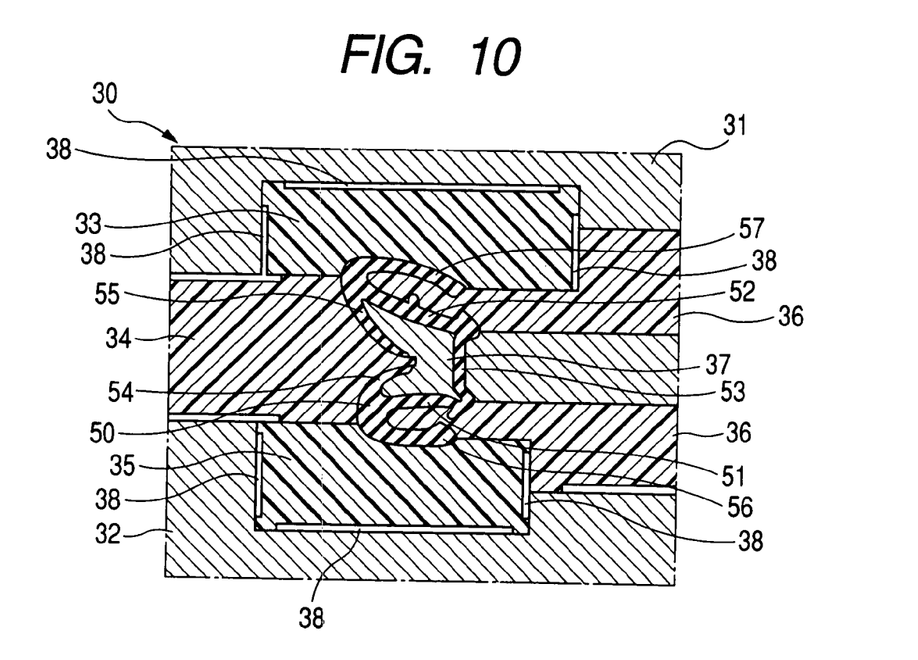
FIG. 10 is a cross sectional view in a direction at right angles to the longitudinal direction of a glass run, of the molding device for molding the corner portion of the glass run which is a third embodiment of the invention.

FIG. 10 is a cross sectional view, in a direction at right angles to the longitudinal direction of the end of the corner portion of a glass run 50, of a molding device 30, which is a third embodiment of the invention, and is for molding the glass run 50.

Figure 11:
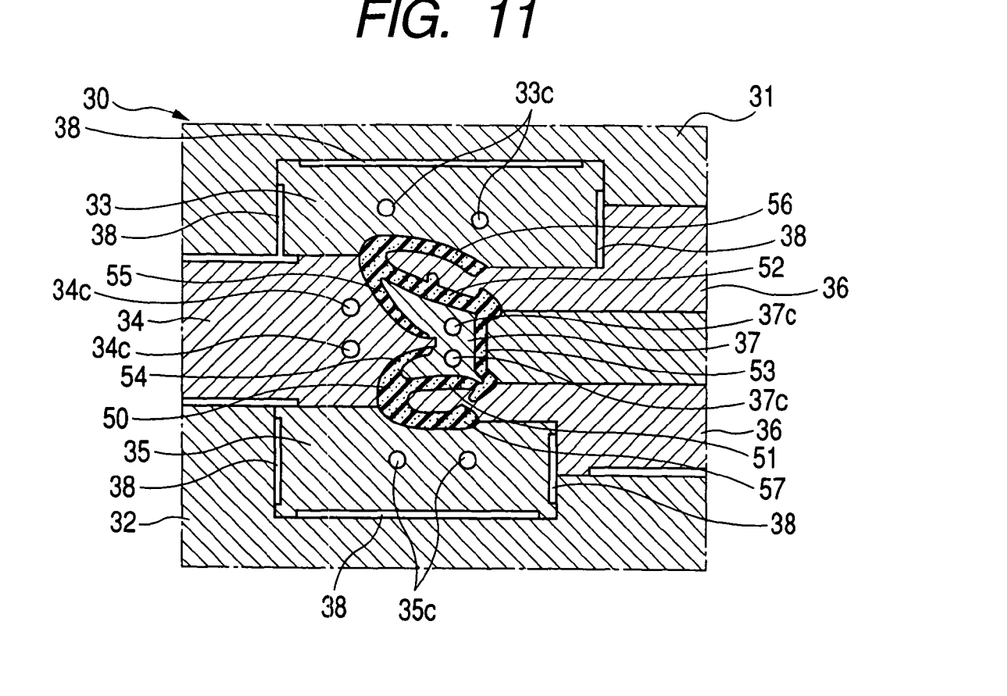
FIG. 11 is a cross sectional view in a direction at right angles to the longitudinal direction of a glass run, of the molding device for molding the corner portion of the glass run which is a fourth embodiment of the invention.

FIG. 11 is a cross sectional view, in a direction at right angles to the longitudinal direction of the end of the corner portion of a glass run 50, of a molding device 30, which is a fourth embodiment of the invention, and is for molding the glass run 50.

Figure 12:
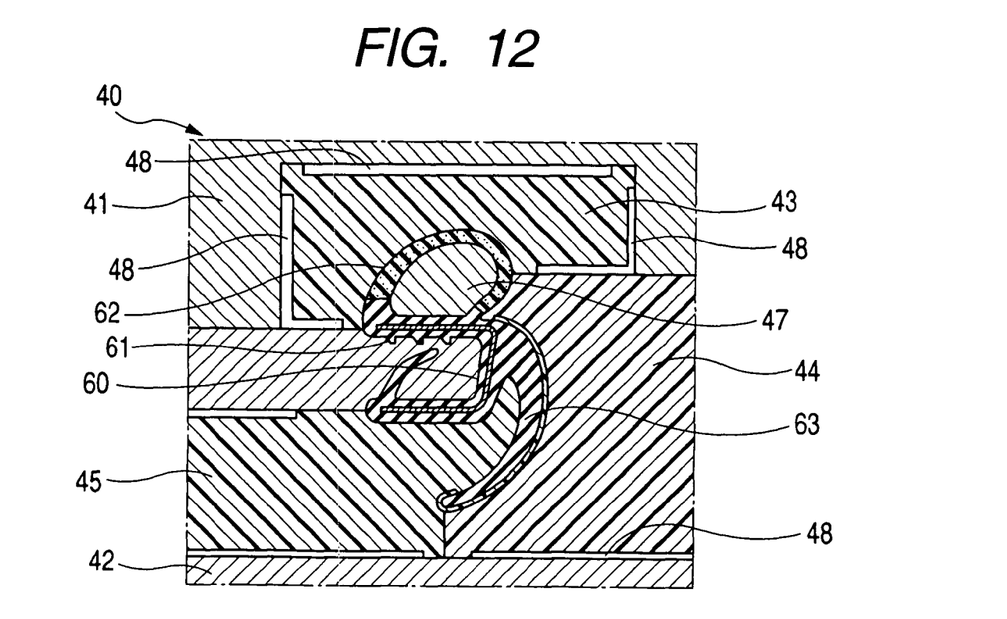
FIG. 12 is a cross sectional view in a direction at right angles to the longitudinal direction of an opening trim weather strip, of the molding device for molding the corner portion of the opening trim weather strip which is a fifth embodiment of the invention.

FIG. 12 is a cross sectional view, in a direction at right angles to the longitudinal direction of the corner portion of an opening trim weather strip 60, of a molding device 40, which is a fifth embodiment of the invention, and is for molding the opening trim weather strip 60.

Figure 13:
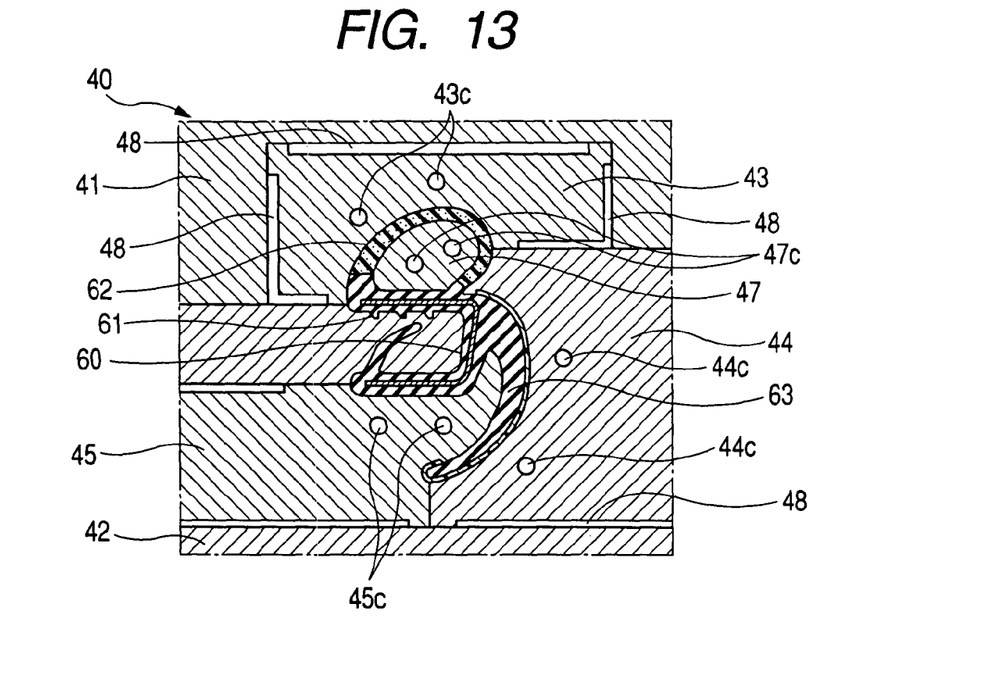
FIG. 13 is a cross sectional view in a direction at right angles to the longitudinal direction of an opening trim weather strip, of a molding device for molding the corner portion of the opening trim weather strip which is a sixth embodiment of the invention.

FIG. 13 is a cross sectional view, in a direction at right angles to the longitudinal direction of the corner portion of an opening trim weather strip 60, of a molding device 40, which is a sixth embodiment of the invention, and is for molding the opening trim weather strip 60.

Figure 14:
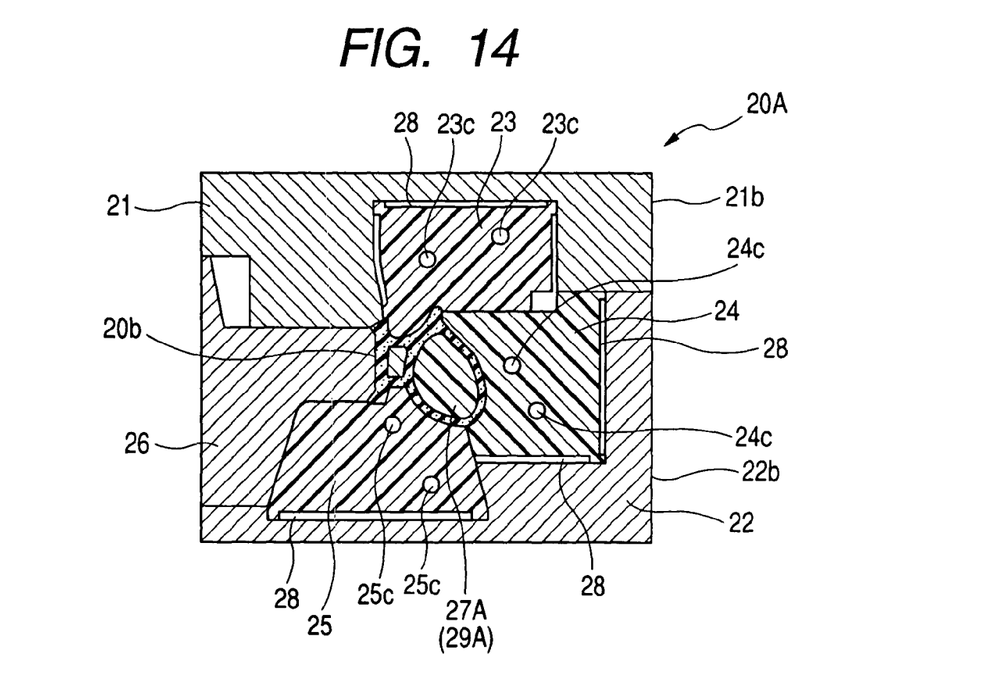
FIG. 14 is a cross sectional view in a direction at right angles to the longitudinal direction of the corner portion to come in contact with the longitudinal side of a door weather strip, in the molding device for molding the corner portion of the door weather strip which is a seventh embodiment of the present invention.

FIG. 14 is a cross sectional view in a direction at right angles to the longitudinal direction of the corner portion to come in contact with the longitudinal side of a door weather strip, in a molding device 20A for molding the corner portion of the door weather strip which is a seventh embodiment of the present invention.

First Embodiment

A method for manufacturing the door weather strip 10, and the molding device 20 therefor according to the first embodiment will be described.

The door weather strip 10 manufactured in accordance with the invention includes, as shown in FIGS. 3 and 4, the extruded portions 17 formed by extrusion, and the molded portion 16 molded by using the molding device 20. The extruded portions 17 include two types of the portion to be attached to the upper side of the door, and the portion to be attached to the longitudinal side, which are different in cross sectional shape from each other. The respective ends of the two pieces of the extruded portions 17 and the molded portion 16 to be attached to the corner portion of the door frame are integrally connected to one another.

First, a description will be given to a method for manufacturing the portion of the molded portion 16 to be connected with the extruded portion 17 to be attached to the longitudinal side of the door frame, and the molding device 20. A description will be given later to the connecting portion between the extruded portion 17 to be attached to the upper side and the molded portion 16.

The extruded portion 17 to be attached to the longitudinal side of the door frame includes, as shown in FIGS. 3 and 4, an attachment base 11 to be attached to the door frame, and a hollow seal portion 12 to come in contact with the peripheral part of the body opening of the vehicle body for sealing.

The attachment base 11 includes a hollow attachment base hollow portion 13 provided in the vicinity of the central part thereof. This can reduce the weight of the door weather strip 10, and can improve the flexibility of the attachment base 11. The hollow seal portion 12, elliptic in cross section, is integrally formed from the attachment base 11. For this reason, the hollow seal portion 12 comes in contact with the peripheral part of the body opening, and is deformed with ease, which enables sealing of the space between it and the door.

The molded portion 16 has the same cross sectional shape at the portion continuous to the extruded portion 17 as the cross sectional shape of the extruded portion 17, and has an attachment base 11 and a hollow seal portion 12. In the vicinity of the center of the corner of the attachment base 11, an inner core extraction hole 15 is formed for extracting the inner core 29 of the molding device 20 described later. The hollow seal portion 12 of the molded portion 16 and the hollow seal portion 12 of the extruded portion 17 are connected at their end faces, so that the hollow portions are continuous to each other. Incidentally, the inner core 29 is for forming the hollowness of the hollow seal portion 12 of the molded portion 16. As shown in FIG. 5, it is supported by an inner core holding plate 29a. Thus, this core holding plate 29a forms the inner core extraction hole 15.

The molding device 20 basically includes, as shown in FIG. 1, an upper mold 21, a lower mold 22, and an inner core 29.

The inner core 29 is, as shown in FIG. 5, set in the cavity 20c formed between the upper mold 21 and the lower mold 22. On the opposite sides of the inner core 29, insertion cores 27 each to be inserted into the hollow seal portion 12 of the extruded portion 17 are attached.

Further, as shown in FIG. 5, the molding device 20 has the cavity 20c for molding the molded portion 16, and a holding portion 20b for clamping the end of the extruded portion 17. At the holding portion 20b of the molding device 20, as shown in FIG. 1, the upper mold 21 includes an upper mold body 21b, and a first holding core 23 for clamping the extruded portion 17. The lower mold 22 includes a lower mold body 22b, a second holding core 24, a third holding core 25, and a fourth holding core 26, for holding the extruded portion 17.

The first holding core 23, the second holding core 24, the third holding core 25, and the insertion core 27 are formed by a material with a low thermal conductivity, such as a heat resistant synthetic resin or a heat resistant synthetic rubber. The fourth holding core 26 is formed by a material for forming other portions of the molding device 20, for example, a metal such as a steel material.

Incidentally, it is acceptable that only the first holding core 23, the second holding core 24, and the third holding core 25 are formed by a material with a low thermal conductivity. Alternatively, it is also acceptable that only the insertion core 27 is formed by a material with a low thermal conductivity.

At least a part of the inner core of the holding portion 20b of the molding device 20 is formed by a material with a low thermal conductivity. Then, although the molding device 20 is heated when the molded portion 16 is integrally molded with the end of the extruded portion 17 clamped by the holding portion 20b, the heat of the molding device 20 is less transferred. This can reduce the indent depth left in the surface of the end. Therefore, it is possible to make favorable the appearance of the end of the extruded portion 17.

The fourth holding core 26 clamps the back side of the attachment base 11 of the extruded portion 17. Therefore, even when a concave portion is formed in the surface, the appearance is not affected. For this reason, it can be formed by a material for forming other portions of the molding device 20.

The material with a low thermal conductivity can be formed by a heat resistant synthetic resin or synthetic rubber. Examples of the heat resistant synthetic resin usable may include ethylene polyfluoride (PTFE), polyfluoroalkoxylene (PFA), polyimide (PI), polyphenylene sulfide (PPS), polyether ether ketone (PEEK), and polybenzimidazole (PBI).

As the heat resistant synthetic rubber, fluorocarbon rubber, silicon rubber, or the like can be used. Incidentally, the heat resistant synthetic resin or synthetic rubber may be a solid material. However, use of a closed-cell expanded sponge material is more preferred.

The first holding core 23 is configured with a heat insulation space 28 provided between it and the body 21b of the upper mold 21 of the molding device 20. For this reason, the first holding core 23 is in contact with the body 21b of the upper mold 21 only at the corner portion. Thus, the heat from the upper mold 21 is less likely to be transferred. For this reason, along with the fact that the first holding core 23 is formed by a material with a low thermal conductivity, heat is less likely to be transferred to the side of the first holding core 23 clamping the end of the extruded portion 17. Thus, it is possible to reduce the indent depth in the surface of the end of the extruded portion 17.

The second holding core 24 and the third holding core 25 also similarly include heat insulation spaces 28 between them and the body of the lower mold 22 of the molding device 20, respectively. For this reason, as with the first holding core 23, heat is less likely to be transferred to the side clamping the end of the extruded portion 17. Thus, it is possible to reduce the indent depth in the surface of the end of the extruded portion 17.

Incidentally, in the heat insulation space 28, a heat insulating material such as ceramic is provided in place of the space. Even this can similarly make heat to be less likely to be transferred to the side clamping the end of the extruded portion 17.

Then, a method for manufacturing the molded portion 16 will be described.

First, the end of the extruded portion 17 of a door weather strip 10 cut to a predetermined dimension is inserted to the insertion core 27 of the tip of the inner core 29 of the molding device 20. Further, the extruded portion 17 for the upper side described later is inserted to the insertion core 27 of the other tip of the inner core 29. At this step, to the hollow seal portion 12 and attachment base hollow portion 13 of the attachment base 11 of the extruded portion 17, the insertion core 27 and the inner core protrusion portion 29b are inserted, respectively. Then, as shown in FIG. 5, in the cavity 20c of the lower mold 22 of the molding device 20, the inner core 29 is disposed.

Then, when the upper mold 21 of the molding device 20 is closed, the molding device 20 forms the cavity 20c, and the ends of the extruded portions 17 of the longitudinal side and the upper side are clamped by the holding portions 20b.

Then, in the cavity 20c, a material for forming the molded portion 16 is injected. When the material is rubber, the molding device 20 is heated to be vulcanized, and, if required, foamed. Upon the vulcanization and foaming, the ends of the molded portion 16 and the ends of the extruded portions 17 can be bonded to each other by the heat. Thus, the molded portion 16 and the extruded portions 17 can be integrally formed.

At this step, as described above, the first holding core 23, the second holding core 24, and the third holding core 25 of the holding portion 20b are formed by a material with a low thermal conductivity and/or the insertion core 27 of the inner core 29 is formed by a material with a low thermal conductivity. Therefore, heat is less likely to be transferred to the surface of the clamped end of the extruded portion 17. As a result, it is possible to reduce the indent depth left in the surface. Therefore, it is possible to make favorable the appearance of the end of the extruded portion 17.

Then, a description will be given to the connecting part between the extruded portion 17 to be attached to the upper side of the door frame and the molded portion 16.

The extruded portion 17 to be attached to the upper side of the door frame includes, as shown in FIGS. 3 and 4, an attachment base 11 to be attached to the door frame, a hollow seal portion 12 formed on the vehicle interior side from the attachment base 11, and coming in contact with the peripheral part of the body opening of the vehicle body for sealing, and a seal lip portion 14 formed on the vehicle exterior side from the attachment base 11, and coming in contact with the peripheral part of the body opening of the vehicle body for sealing.

The extruded portion 17 to be attached to the upper side of the door frame is different from the extruded portion 17 to be attached to the longitudinal side of the door frame in that the seal lip portion 14 is formed from the attachment base 11.

The portion of the molded portion 16 continuous to the extruded portion 17 has the same cross sectional shape as the cross sectional shape of the extruded portion 17, and it has an attachment base 11, a hollow seal portion 12, and a seal lip portion 14.

As shown in FIG. 6, the structures of the insertion core 27 and the third holding core 25 of the molding device 20 for forming the attachment base 11 and the hollow seal portion 12 are the same. The holding portions 20b of the molding device 20 clamping the seal lip portion 14 are the portions of the first holding core 23 and the second holding core 24. Thus, the seal lip portion 14 is clamped by both the sides of the first holding core 23 and the second holding core 24 with a low thermal conductivity. This can reduce the indent depth left in the surface of the seal lip portion 14. Therefore, it is possible to make favorable the appearance of the seal lip portion 14.

Second Embodiment

A molding device 20 for manufacturing the door weather strip 10 according to the second embodiment will be described. The molding device 20 has basically a similar structure to the molding device 20 according to the first embodiment.

In the second embodiment, the first holding core 23, the second holding core 24, and the third holding core 25 include cooling holes 23c, 24c, and 25c, formed in their respective insides so as to allow a refrigerant to circulate therein. The cooling holes 23c, 24c, and 25c will be described by taking the cooling hole 24c as an example.

As for the cooling holes 24c, as shown in FIGS. 7 and 8, two cooling holes 24c are provided inside the second holding core 24. The tips of the two cooling holes 24c in the second holding core 24 are connected so that the holes are continuous to each other as shown in FIG. 2. The other tips of the two cooling holes 24c are connected to a cooling hole of a cooling unit (not shown) formed outside of the molding device 20. With this configuration, the refrigerant can circulate in the cooling holes 24c. Thus, the refrigerant heated in the second holding core 24 is fed to the cooling unit, and is allowed to circulate therein again.

The cooling holes 23c, 24c, and 25c can also be formed in all of the first holding core 23, the second holding core 24, and the third holding core 25.

In at least a part of the holding portion 20b of the molding device 20, cooling holes 23c, 24c, and 25c for cooling the holding cores 23, 24, and 25 are formed in their respective insides. This enables the refrigerant to circulate in the cooling holes 23c, 24c, and 25c as described above. With this configuration, although the molding device 20 is heated when the molded portion 16 is integrally molded with the end of the extruded portion 17 clamped by the holding portion 20b, the heat from the molding device 20 less transfers to the respective holding cores 23, 24, and 25. As a result, it is possible to reduce the indent depth left in the surface of the end of the extruded portion 17 due to heat reforming. Therefore, it is possible to make favorable the appearance of the end of the extruded portion 17.

The fourth holding core 26 clamps the back side of the attachment base 11 of the extruded portion 17. Therefore, even when a concave portion is formed in the surface, the appearance is not affected. For this reason, cooling holes are not required to be formed inside the fourth holding core 26.

Around the first holding core 23, a heat insulation space 28 is provided between it and the body of the upper mold 21 of the molding device 20. For this reason, the first holding core 23 is in contact with the body of the upper mold 21 only at the corner portion. Thus, the heat from the upper mold 21 is less likely to be transferred. For this reason, along with the fact that the cooling holes 23c are formed in the first holding core 23, heat is less likely to be transferred to the side of the first holding core 23 clamping the end of the extruded portion 17. Thus, it is possible to reduce the indent depth left in the surface of the end of the extruded portion 17.

Around the second holding core 24 and the third holding core 25, heat insulation spaces 28 are provided between them and the body of the lower mold 22 of the molding device 20, respectively. For this reason, as with the first holding core 23, heat is less likely to be transferred to the side clamping the end of the extruded portion 17. Thus, it is possible to reduce the indent depth left in the surface of the end of the extruded portion 17.

Incidentally, in the heat insulation space 28, a heat insulating material such as ceramic is provided in place of the space. Even this can similarly make heat to be less likely to be transferred to the side clamping the end of the extruded portion 17.

Then, a method for manufacturing the molded portion 16 will be described.

First, the end of the extruded portion 17 of a door weather strip 10 cut to a predetermined dimension is inserted to the insertion core portion 27 of the tip of the inner core 29 of the molding device 20. Further, the extruded portion 17 for the upper side described later is inserted to the insertion core portion 27 of the other tip of the inner core 29. At this step, to the hollow seal portion 12 and the attachment base hollow portion 13 of the attachment base 11 of the extruded portion 17, the insertion core portion 27 and the inner core protrusion portion 29b are inserted, respectively. Then, as shown in FIG. 5, in the cavity 20c of the lower mold 22 of the molding device 20, the inner core 29 is disposed.

Then, when the upper mold 21 of the molding device 20 is closed, the molding device 20 forms the cavity 20c, and the ends of the extruded portions 17 of the longitudinal side and the upper side are clamped by the holding portions 20b.

Then, in the cavity 20c, a material for forming the molded portion 16 is injected. When the material is rubber, the molding device 20 is heated to be vulcanized, and, if required, foamed. Upon the vulcanization and foaming, the ends of the molded portion 16 and the ends of the extruded portions 17 can be bonded to each other by the heat. Thus, the molded portion 16 and the extruded portions 17 can be integrally formed.

According to the second embodiment, in the first holding core 23, the second holding core 24, and the third holding core 25 of the holding portion 20b, the cooling holes 23c, 24c, and 25c are formed. As a result, it is possible to reduce the indent depth left in the surface of the clamped end of the extruded portion 17, when the molded portion 16 is molded by using the molding device 20. Therefore, it is possible to make favorable the appearance of the end of the extruded portion 17.

A description will be given to the connecting part between the extruded portion 17 to be attached to the upper side of the door frame and the molded portion 16.

In the second embodiment, the portion of the molded portion 16 continuous to the extruded portion 17 has the same cross sectional shape as the cross sectional shape of the extruded portion 17, and it has an attachment base 11, a hollow seal portion 12, and a seal lip portion 14. As shown in FIG. 9, the structures of the insertion core portion 27 and the third holding core 25 of the molding device 20 for forming the attachment base 11 and the hollow seal portion 12 are similar to the first embodiment. The holding portions 20b of the molding device 20 clamping the seal lip portion 14 are the portions of the first holding core 23 and the second holding core 24. The cooling holes 23c and 24c are formed therein, respectively, as described above. The seal lip portion 14 is clamped by both the sides of the first holding core 23 and the second holding core 24. For this reason, heat is less likely to transfer to the surface of the seal lip portion 14. As a result, the indent depth left in the surface can be reduced. Therefore, it is possible to make favorable the appearance of the seal lip portion 14.

Incidentally, it is acceptable that the door weather strip 10 includes no hollow seal portion 12 but includes only the seal lip 14 formed therein.

Third Embodiment

A description will be given to a manufacturing method for molding the corner portion of the glass run 50, and the molding device 30 according to the third embodiment by reference to FIG. 10. The glass run 50 includes, as with the door weather strip 10, an extruded portion formed by extrusion, and a molded portion molded by using the molding device 30.

The extruded portion of the glass run 50 is provided with a glass run body, U-shaped in cross section, including a vehicle exterior side sidewall 51, a vehicle interior side sidewall 52, and a bottom wall 53 connecting the vehicle exterior side sidewall 51 and the vehicle interior side sidewall 52, U-shaped in cross section, a vehicle exterior side seal lip 54 and a vehicle interior side seal lip 55 obliquely extending from their respective tips of the vehicle exterior side sidewall 51 and the vehicle interior side sidewall 52 toward the inside of the glass run body, and a vehicle exterior side cover lip 56 and a vehicle interior side cover lip 57 extending from their respective tips of the vehicle exterior side sidewall 51 and the vehicle interior side sidewall 52 outwardly in generally parallel with the vehicle exterior side sidewall 51 and the vehicle interior side sidewall 52, respectively.

The portion of the molded portion continuous to the extruded portion of the glass run 50 has the same cross sectional shape as the cross sectional shape of the extruded portion. It has a glass run body, U-shaped in cross section, including the vehicle exterior side sidewall 51, the vehicle interior side sidewall 52, and the bottom wall 53 connecting the vehicle exterior side sidewall 51 and the vehicle interior side sidewall 52, U-shaped in cross section, the vehicle exterior side seal lip 54, the vehicle interior side seal lip 55, the vehicle exterior side cover lip 56, and the vehicle interior side cover lip 57.

The molding device 30 therefor basically includes, as shown in FIG. 10, an upper mold 31, a lower mold 32, an inner plate 36, and an inner core 37.

In the end of the extruded portion of the glass run 50, the inner plates 36 are inserted into the space between the vehicle exterior side sidewall 51 and the vehicle exterior side cover lip 56, and the space between the vehicle interior side sidewall 52 and the vehicle interior side cover lip 57. The inner core 37 is inserted into the inside of the glass run body. For clamping of the end of the extruded portion of the glass run 50, a first holding core 33, a second holding core 34, and a third holding core 35 clamp the surface of the glass run 50, and the inner plate 36 and the inner core 37 clamp the inner side and the back side of the glass run 50.

The first holding core 33, the second holding core 34, and the third holding core 35 are all formed by a material with a low thermal conductivity. This can reduce the heat transfer to the glass run 50. Thus, it is possible to reduce the indent depth left in the surface of each of the vehicle exterior side seal lip 54, the vehicle interior side seal lip 55, the vehicle exterior side cover lip 56, and the vehicle interior side cover lip 57 of the glass run 50. Therefore, it is possible to make favorable the appearance thereof. Further, when parts of the inner plate 36 and the inner core 37 are both formed by a material with a low thermal conductivity, it is possible to still further reduce the indent depth left in the surface.

Whereas, the first holding core 33, the second holding core 34, and the third holding core 35 hold heat insulation spaces 38 in the portions in contact with the main bodies of the upper mold 31 and the lower mold 32 of the molding device 30. Therefore, it is possible to still further minimize the heat transfer from the upper mold 31 and the lower mold 32 of the molding device 30 to the first holding core 33, the second holding core 34, and the third holding core 35.

Fourth Embodiment

A description will be given to a manufacturing method for molding the corner portion of the glass run 50, and the molding device 30 according to the fourth embodiment by reference to FIG. 11.

Similarly to the third embodiment, the portion of the molded portion continuous to the extruded portion of the glass run 50 has the same cross sectional shape as the cross sectional shape of the extruded portion. It has a glass run body, U-shaped in cross section, including the vehicle exterior side sidewall 51, the vehicle interior side sidewall 52, and the bottom wall 53 connecting the vehicle exterior side sidewall 51 and the vehicle interior side sidewall 52, the vehicle exterior side seal lip 54, the vehicle interior side seal lip 55, the vehicle exterior side cover lip 56, and the vehicle interior side cover lip 57.

In the fourth embodiment, the first holding core 33, the second holding core 34, the third holding core 35, the inner plate 36, and the inner core 37 all include cooling holes 33c, 34c, 35c, and 36c in their insides. This can reduce the heat transfer to the glass run 50. Thus, it is possible to reduce the indent depth left in the surface of each of the vehicle exterior side seal lip 54, the vehicle interior side seal lip 55, the vehicle exterior side cover lip 56, and the vehicle interior side cover lip 57 of the glass run 50. Therefore, it is possible to make favorable the appearance thereof.

Fifth Embodiment

A description will be given to a manufacturing method for molding the corner portion of the opening trim weather strip 60, and a molding device 40 according to the fifth embodiment. The opening trim weather strip 60 includes, as with the door weather strip 10, an extruded portion, and a molded portion molded by the molding device 40.

The extruded portion of the opening trim weather strip 60 includes a trim portion 61, U-shaped in cross section, a hollow seal portion 62 formed on the lateral side of the trim portion 61, and a cover lip portion 63 formed on the top side of the trim portion 61.

The portion of the molded portion continuous to the extruded portion of the opening trim weather strip 60 has the same cross sectional shape as the cross sectional shape of the extruded portion. It has a trim portion 61, U-shaped in cross section, a hollow seal portion 62, and a cover lip portion 63.

The molding device 40 includes, as shown in FIG. 12, an upper mold 41, a lower mold 42, and an inner core 49 having an insertion core portion 47. A first holding core 43, a second holding core 44, a third holding core 45, and an insertion core portion 47 are formed by a synthetic resin with a low thermal conductivity.

At the end of the extruded portion of the opening trim weather strip 60, the insertion core portion 47 is inserted into the inside of the hollow seal portion 62 of the opening trim weather strip 60. The outer side of the hollow seal portion 62 is clamped by the first holding core 43 and the second holding core 44.

The cover lip portion 63 is clamped by the second holding core 44 and the third holding core 45.

The first holding core 43, the second holding core 44, the third holding core 45, and the insertion core portion 47 are all formed by a material with a low thermal conductivity. This can reduce the heat transfer to the hollow seal portion 62 and the cover lip portion 63 of the opening trim weather strip 60. As a result, it is possible to reduce the indent depth left in the surface of each of the hollow seal portion 62 and the cover lip portion 63 of the opening trim weather strip 60. Therefore, it is possible to make favorable the appearance.

Incidentally, as the molding material for the door weather strip 10, the glass run 50, and the opening trim weather strip 60, a synthetic rubber is used. For example, as the synthetic rubber, EPDM rubber is used. In order to improve the flexibility, preferably, the material is foamed, and used as a sponge material.

Sixth Embodiment

A description will be given to a manufacturing method for molding the corner portion of the opening trim weather strip 60, and a molding device 40 according to the sixth embodiment.

Similar to the fifth embodiment, the molding device 40 includes, as shown in FIG. 13, an upper mold 41, a lower mold 42, and an inner core 49 having an insertion core portion 47. In the sixth embodiment, a first holding core 43, a second holding core 44, a third holding core 45, 49 all include cooling holes 43c, 44c, and 45c formed in their respective insides.

At the end of the extruded portion of the opening trim weather strip 60, the insertion core portion 47 of the inner core 49 is inserted into the inside of the hollow seal portion 62 of the opening trim weather strip 60. The outer side of the hollow seal portion 62 is clamped by the first holding core 43 and the second holding core 44.

The cover lip portion 63 is clamped by the second holding core 44 and the third holding core 45.

The first holding core 43, the second holding core 44, and the third holding core 45 all include cooling holes 43c, 44c, and 45c formed therein. This can reduce the heat transfer to the hollow seal portion 62 and the cover lip portion 63 of the opening trim weather strip 60. As a result, it is possible to reduce the indent depth left in the surface of each of the hollow seal portion 62 and the cover lip portion 63 of the opening trim weather strip 60. Therefore, it is possible to make favorable the appearance thereof.

Incidentally, as the molding material for the door weather strip 10, the glass run 50, and the opening trim weather strip 60, a synthetic rubber is used. For example, as the synthetic rubber, EPDM rubber is used. In order to improve the flexibility, preferably, the material is foamed, and used as a sponge material.

The molding device to be cooled is not limited to a metal, and a material with a low thermal conductivity (e.g., a heat resistant resin or a heat resistant rubber) is preferably used in the form of an inner core. Particularly, the insertion core portion of the inner core is desired to be cooled, but piping therefor is difficult. Further, the whole core is cooled, which makes impossible vulcanization of the molded portion. For this reason, preferably, for the insertion core portion, a material with a low thermal conductivity is used, and for other holding cores, cooling holes are provided in the material with a low thermal conductivity, resulting in a composite structure.

Seventh Embodiment

The molding device 20A according to the seventh embodiment has a composite structure of the molding devices according to the first embodiment and the second embodiment. The molding device 20A has basically the structure to the molding device 20 according to the second embodiment as shown in FIG. 14 and the holding cores are made of a material with a low thermal conductivity similar to the first embodiment.

In the seventh embodiment, the insertion core portion 27A of the inner core 29A is formed by the material with the low thermal conductivity. The other holding cores 23, 24 and 25 are also provided with the material with the low thermal conductivity. The cooling holes 23c, 24c and 25c are provided in the holding cores 23, 24 and 25.

What is claimed is:

1. A molding device for forming a weather strip including an extruded portion formed by extrusion and a molded portion connected with an end of the extruded portion, the molding device comprising:

a mold body;

a holding portion for clamping the end of the extruded portion; and a cavity for forming the molded portion, wherein the holding portion has a holding core to come in contact with the end of the extruded portion, and at least a part of the holding core is provided with a thermal conduction diminishing portion, said at least said part of the thermal conduction diminishing portion being formed by a material with a low thermal conductivity, and wherein the material with the low thermal conductivity comprises a heat resistant synthetic resin or a heat resistant rubber.

2. The molding device for forming a weather strip according to claim 1, wherein the extruded portion has a hollow seal portion, the holding portion of the molding device is provided with an insertion core for being inserted into the hollow seal portion, and a holding core for pressing and clamping an outer side of the hollow seal portion, and the insertion core is formed by a material with a low thermal conductivity.

3. The molding device for forming a weather strip according to claim 1, wherein the extruded portion has a seal lip portion, the holding portion of the molding device is provided with a holding core for pressing and clamping an outer side and an inner side of the seal lip portion, and at least a pressing side of the holding core is formed by a material with a low thermal conductivity.

4. The molding device for forming a weather strip according to claim 1, wherein a heat insulation space or a heat insulating material is provided between the holding core and the mold body.

5. The molding device for forming a weather strip according to claim 1, wherein the holding core includes a cooling hole, through which a refrigerant for cooling the holding core is circulated, formed in an inside of the holding core.

6. The molding device for forming a weather strip according to claim 3, wherein at least a part of the holding core includes a cooling hole, through which a refrigerant for cooling the holding core is circulated, formed in an inside of the holding core.

7. The molding device for forming a weather strip according to claim 1, wherein a heat insulation space or a heat insulating material is provided between the holding core and the mold body, said holding core contacting an entirety of a peripheral area of the end of the extruded portion.

* * * * *